A. SPILLMAN.
ANTIBACKLASH GEAR.
APPLICATION FILED JUNE 18, 1917.
1,317,232.
Patented Sept. 30, 1919.
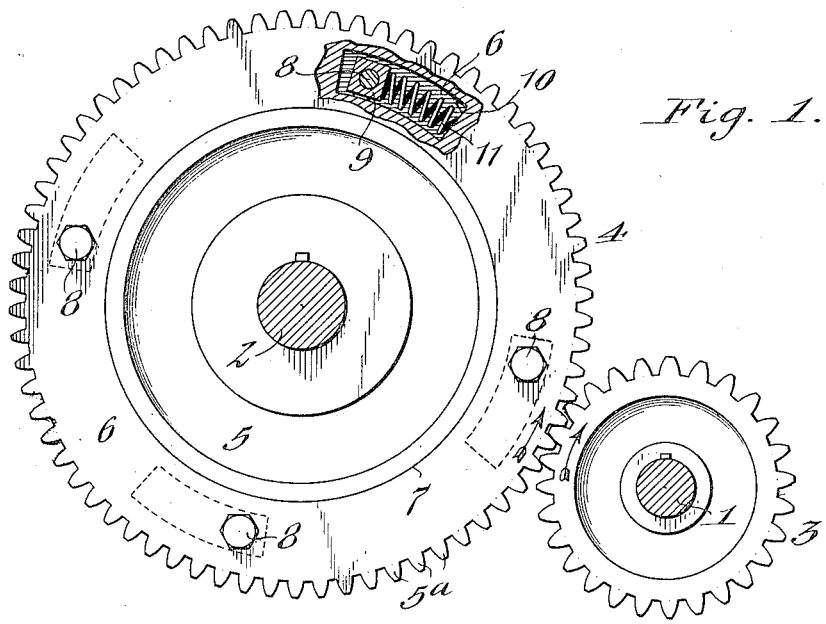
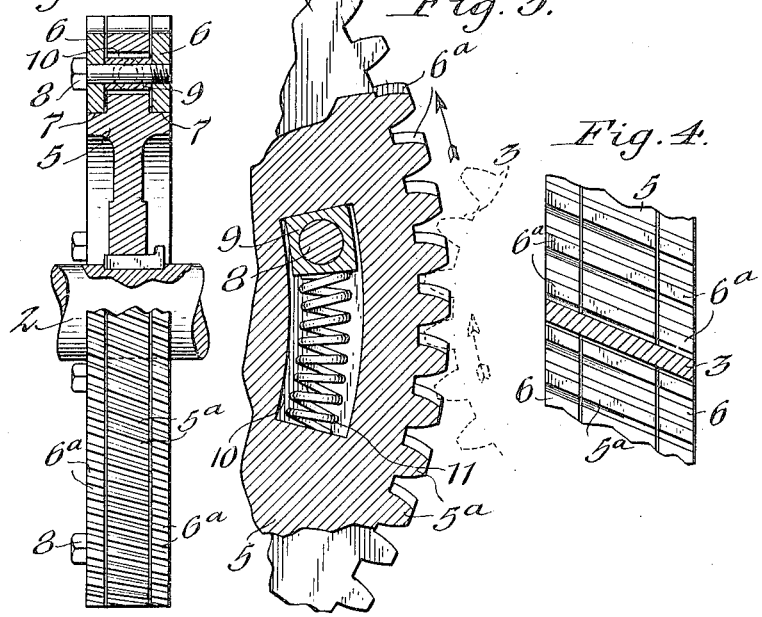
Inventor,
Albert Spillman,
by George Popp
Attorneys.

UNITED STATES PATENT OFFICE.

ALBERT SPILLMAN, OF NORTH TONAWANDA, NEW YORK.

ANTIBACKLASH-GEAR.

1,317,232.　　　　　Specification of Letters Patent.　　Patented Sept. 30, 1919.

Application filed June 18, 1917. Serial No. 175,304.

*To all whom it may concern:*

Be it known that I, ALBERT SPILLMAN, a citizen of the United States, residing at North Tonawanda, in the county of Niagara and State of New York, have invented new and useful Improvements in Antibacklash-Gears, of which the following is a specification.

This invention relates to an improved gear wheel designed more particularly for driving the cam shaft and the magneto or water-pump shaft of automobiles, but the same may be used generally for transmitting power from one shaft to another.

The object of my invention is to provide such gears with effective and inexpensive means for preventing backlash or rattling thereof after their teeth have become worn more or less, thus materially prolonging their life and effecting an important saving in maintenance.

In the accompanying drawings:

Figure 1 is a side elevation, partly in section, of a gear embodying the improvement. Fig. 2 is an edge view thereof, the lower half being shown in elevation and the upper half in section. Fig. 3 is an enlarged fragmentary section of the gear on line 3—3, Fig. 2. Fig. 4 is an enlarged face view of a fragment of the same with a tooth of the driving pinion in mesh therewith, the pinion being shown in section.

Similar characters of reference indicate corresponding parts throughout the several views.

1 and 2 indicate a pair of parallel shafts, such as the crank-shaft and the cam shaft, of an automobile-motor. 3 is a toothed pinion or gear keyed to the crank shaft and acting as the driver for the improved gear 4 keyed to the cam shaft, both gears preferably having oblique or skew-teeth, as shown.

The improved gear comprises a toothed main wheel or body-section fixed to the shaft 2, and one or more yieldable or spring-pressed rims or sections arranged beside the body section and movable circumferentially thereof, the rims having teeth adapted to form continuations of the teeth of the body-section when in line therewith. In the example illustrated in Figs. 1–3, the gear is composed of a fixed central or body section 5 and a pair of relatively movable rims or sections 6 arranged on opposite sides of the fixed section, 5ª indicating the teeth of the latter and 6ª the teeth of the rims. These rims are supported on annular shoulders 7 of the body-sections, so that they may oscillate freely thereon. They are united by transverse tie-bolts 8 passing through them and through space-blocks 9 arranged at suitable intervals in segmental slots 10 in the fixed gear-section 5, whereby the two rims are caused to turn together. A suitable spring or cushion 11 is interposed between each space block and the rear end of the companion slot. The teeth of the pinion 3 are as wide as the combined width of the teeth of the body-section 5 and the rims 6.

By this construction, when the improved gear is out of mesh with the driving gear, the springs are relaxed, or nearly so, and the teeth of the side rims are out of alinement with those of the body-section, as shown in Figs. 2 and 3. When, however, the teeth of the driving pinion enter between those of the improved gear, the teeth of the rims are forced backwardly into line with the teeth of the body-section, as shown in Figs. 1 and 4, thereby compressing the springs 11. The result is that the springs by their reaction constantly force the front sides of the teeth of the rims against the backs of the teeth of the pinion and automatically take up any wear of the teeth of the body-section, thereby preventing rattling or backlash of the gear which would otherwise take place.

This construction greatly increases the durability of the gear, inasmuch as its teeth may be worn considerably before necessitating the renewal of the gear.

To obviate binding of the rims against the side of the body-section, the space-blocks 9 are slightly longer than the width or thickness of the slotted portion of said section, as shown in Fig. 2.

The gear may be provided with a greater or less number of anti-backlash rims or rings, but at least one fixed body-section and one rim are necessary.

Preferably the body section is made of steel, while the rims are of steel, iron, brass or other suitable material; and the rims may be somewhat narrower than the body-section as shown, or of the same width, if desired.

I claim as my invention:

1. A gear wheel, comprising a toothed body-section, toothed, anti-backlash rims arranged on opposite sides of the body-section and mounted to oscillate thereon, the body-section having slots, space blocks arranged in said slots between said rims, tie-bolts passing through said rims and space-blocks, and springs seated in said slots and each bearing at one end against the companion space block and at its other end against the adjacent end of the corresponding slot.

2. A gear wheel, comprising a toothed body-section having annular shoulders at opposite sides thereof, toothed anti-backlash rims seated on said shoulders and capable of oscillating thereon, the body-section being provided between said shoulder and its teeth with segmental slots, space-blocks arranged in said slots between said rims, tie-bolts passing through said rims and space blocks, and springs seated in said slots and bearing against said space blocks and the rear ends of the slots, respectively.

ALBERT SPILLMAN.